United States Patent [19]
Bommarito

[11] 3,829,142
[45] Aug. 13, 1974

[54] SHOCK ABSORBING MOUNTING FOR MOTOR VEHICLE

[76] Inventor: Dominic M. Bommarito, 14977 Arcola, Livonia, Mich. 48154

[22] Filed: Jan. 22, 1973

[21] Appl. No.: 325,427

[52] U.S. Cl. .................................................. 293/86
[51] Int. Cl. ............................................. B60r 19/04
[58] Field of Search ................... 293/85, 86, DIG. 2

[56] References Cited
UNITED STATES PATENTS
| | | | |
|---|---|---|---|
| 1,503,049 | 7/1924 | Jezek | 293/85 |
| 1,925,461 | 9/1933 | Ridge | 293/DIG. 2 |
| 2,805,881 | 9/1957 | Blake | 293/86 |

FOREIGN PATENTS OR APPLICATIONS
| | | | |
|---|---|---|---|
| 649,021 | 12/1928 | France | 293/85 |
| 252,540 | 6/1926 | Great Britain | 293/85 |

Primary Examiner—M. Henson Wood, Jr.
Assistant Examiner—Robert Saifer
Attorney, Agent, or Firm—Charles W. Chandler

[57] ABSTRACT

A vehicle having a bumper connected to the vehicle frame by a pair of telescopic tubes disposed in a cylindrical helical spring such that the vehicle can be raised by jacking up the bumper. A shock absorber is housed within the tubes to yieldingly oppose the motion of the bumper toward the vehicle frame. The helical spring biases the bumper away from the frame so that the bumper can receive an impact in a collision without damaging the vehicle body.

4 Claims, 4 Drawing Figures

PATENTED AUG 13 1974    3,829,142

SHOCK ABSORBING MOUNTING FOR MOTOR VEHICLE

BACKGROUND OF THE INVENTION

This invention is related to vehicles having bumpers mounted to absorb an impact and more particularly to a bumper having a mounting housing a shock absorber that is actuated by either a lateral or a head-on impact received by the bumper.

Some vehicles have crash-resistant bumpers so mounted as to be movable toward the frame upon impact. Hydraulic means, disposed between the bumper and frame, absorbs the energy of the impact to prevent damage to the vehicle body. One problem with such bumpers has been their limited capability to either absorb a lateral impact or to be jacked up to raise the vehicle.

SUMMARY OF THE INVENTION

The broad purpose of the present invention is to provide a shock absorbing bumper mounting having a pair of tubular members housing a self-contained hydraulic shock absorber. The tubular members are so connected between the bumper and the vehicle frame as to telescope one within the other as the bumper receives an impact. As the tubular members are telescoped, the shock absorber receives the energy of the impact. The tubular members are housed in a large cylindrical spring which biases the bumper toward its normal position so that the bumper can receive a second impact without damaging the vehicle body.

The preferred mounting is sturdily composed of a relatively few components, and can be mounted on an existing vehicle construction by using appropriate brackets.

Still further objects and advantages will become readily apparent to those skilled in the art to which the invention pertains upon reference to the following detailed description.

DESCRIPTION OF THE DRAWING

The description refers to the accompanying drawing in which like reference characters refer to like parts throughout the several views and in which.

DESCRIPTION OF THE PREFERRED EMBODIMENT

Figure 1:
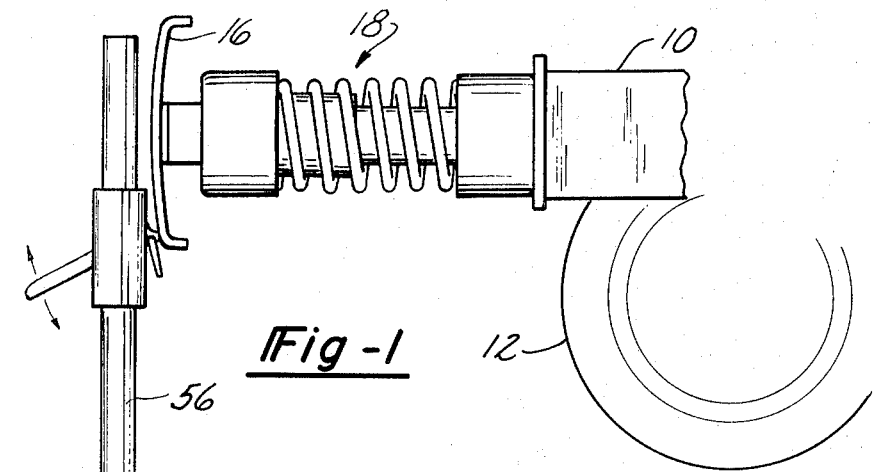
FIG. 1 is a fragmentary view of a vehicle having a bumper mounted on a vehicle frame in accordance with the invention, and showing a conventional bumper jack engaged with the bumper for raising the vehicle.

Now referring to the drawing, a fragmentary portion of a conventional automotive vehicle frame 10 is illustrated in FIG. 1 as being mounted by appropriate means on wheel 12 which engages ground 14. A front bumper 16 is connected to vehicle frame 10 by shock absorbing mounting 18.

Figure 2:
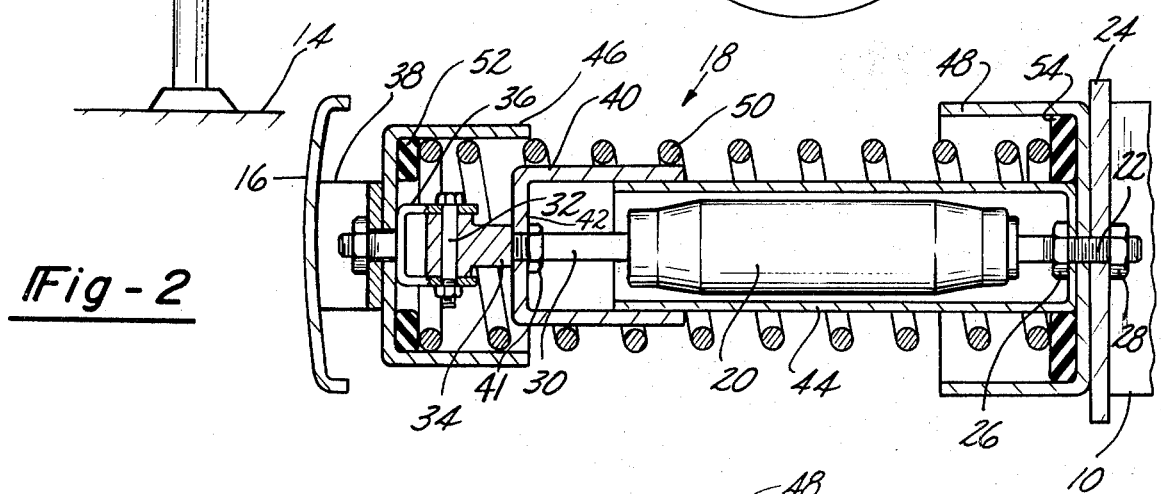
FIG. 2 is a longitudinal sectional view through the preferred shock absorbing mounting showing the bumper in its normal position with respect to the vehicle frame.
Figure 3:
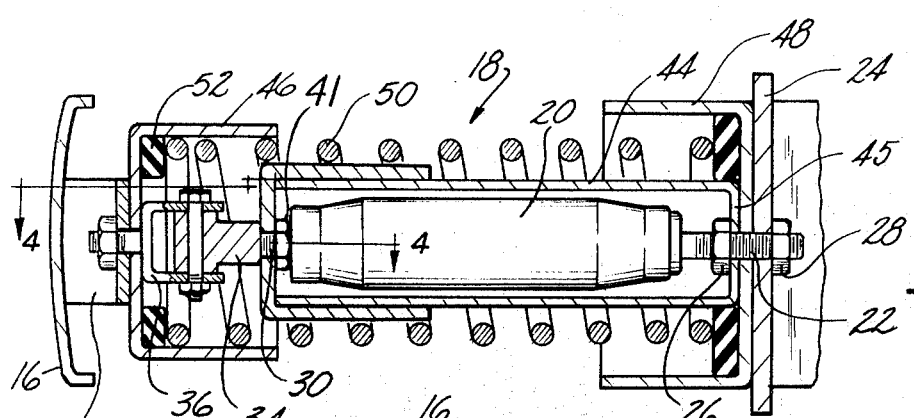
FIG. 3 is similar to FIG. 2 but shows the shock absorbing mounting in a retracted position.

Referring to FIG. 2, an elongated conventional hydraulic shock absorbing cylinder 20 is disposed between bumper 16 and frame 10. Cylinder 20 has a threaded rod 22 mounted on a bracket 24 carried by frame 10. A pair of lock nuts 26 and 28 lock the housing 20 against relative motion with respect to frame 10.

A piston rod 30 is slideably carried by hydraulic cylinder 20. A pivot pin 32 is carried by a bearing member 34 mounted on the end of piston rod 30. A clevis 36 is mounted on a bracket 38 attached to the back side of fender 16. Pin 32 is carried by the clevis in such a manner that the bumper can be pivoted sideways with respect to piston rod 30 as illustrated by the phantom lines in FIG. 4.

Hydraulic cylinder 20 is a conventional self-contained hydraulic unit that yieldingly opposes the motion of piston rod 30 with respect to the cylinder. As bumper 16 is moved toward frame 10, the energy of the impact moving the bumper is absorbed by hydraulic cylinder 20. It is to be noted that the connection between clevis 36 and piston rod 30 is such that although the bumper can be moved sidewise with respect to the frame, the frame can be raised by jacking up the bumper.

A tubular member 40 has an end wall 42 locked between bearing member 34 and nut 41 such that the tube encloses piston rod 30.

A second tube 44 has a wall 45 locked between nut 26 and bracket 24 such that tube 44 is fixed against motion with respect to frame 10. Tube 44 provides a housing for cylinder 20 and is slidably engaged with tube 40 so as to be telescopically received within tube 40 as the bumper is moved toward the vehicle frame. The arrangement is such that as bumper 16 is jacked up the tubes cooperate to raise the vehicle frame.

A pair of caps 46 and 48 enclose the ends of tubes 40 and 44 respectively. Each cap has a diameter greater than its respective tube. A cylindrical vehicle spring 50 encloses the two tubes with its opposite ends being engaged with caps 46 and 48. Spring 50 has an inner diameter accommodating the diameter of tube 40 and has a stiffness that assists in preventing bumper 16 from moving toward the frame as the bumper is being jacked up.

An annular resilient member 52 is disposed between one end of spring 50 and cap 46, and a second resilient annular member 54 is disposed between the opposite end of spring 50 and cap 48 to provide a sound-absorbing mounting for the spring.

In operation the bumper 16 is normally spaced with respect to frame 10 as illustrated in FIG. 2. Spring 50 biases the bumper toward its normal position. When the user has to raise the vehicle frame 10 above ground 14, the user employs a conventional bumper jack 56 as illustrated in FIG. 1, to engage the bumper and raise it above the ground. As bumper 16 is jacked up, the entire mounting 18 moves together with the bumper and thereby raises frame 10.

In the event of an accident, in which bumper 16 is moved by an impact toward frame 10, tubes 40 and 44 telescope with respect to one another so that the energy of the impact is absorbed by rod 30 being received by hydraulic cylinder 20. Spring 50 then returns bumper 16 outwardly toward its normal position so that the bumper returns to receive another impact.

Figure 4:
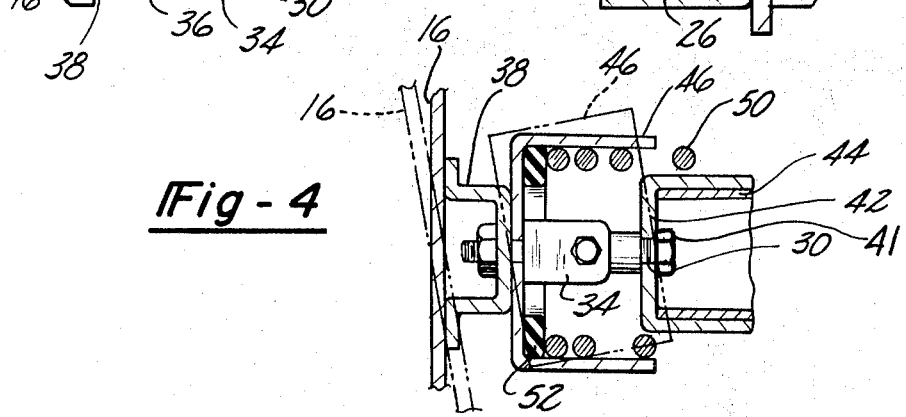
FIG. 4 is a view taken along lines 4—4 of FIG. 3.

As illustrated in FIG. 4, the connection between the shock absorber and the bumper is such that the bumper can receive a sidewise impact which swings the bumper sidewise in such a manner that the shock absorber can still absorb the energy of the impact.

Having described my invention, I claim:

1. In combination with a vehicle having ground-engaging means, a vehicle frame;
a bumper mounted on one end of the frame;
a pair of telescopically engaged tubular members disposed between the bumper and the frame;
an elongated hydraulic shock absorber means housed within said tubular members, said shock absorber means including a cylinder and a piston rod slidably carried by the cylinder;
first means attaching one of the tubular members and said cylinder to the vehicle frame;
second means connecting the other of said tubular members to the piston rod, said second means including clevis and pin means between the other of the tubular members and the bumper such that the bumper is laterally moveable with respect to the motion of the piston rod as the bumper is being moved toward the frame;
the tubular members being so connected one to the other as to prevent the piston rod from being laterally moved with respect to the hydraulic cylinder as the bumper is being raised to lift the vehicle frame and the ground-engaging wheels above the ground;
a cylindrical coil spring having one end engaged with the frame and its other end engaged with the bumper to bias it away from the frame, the spring being mounted such that the clevis and pin means are disposed within the coils of the spring; and
cap means for seating the opposite ends of the coil spring.

2. A combination as claimed in claim 1, in which said first means comprises the shock absorber having a threaded rod and nut means mounted on said rod and engaged with said vehicle frame.

3. A combination as defined in claim 1, in which the tubular members are substantially entirely enclosed within the coils of the spring.

4. A combination as defined in claim 1, including a resilant member mounted between the coil spring and said cap means.

* * * * *